(12) United States Patent
Takasu et al.

(10) Patent No.: US 12,680,908 B2
(45) Date of Patent: Jul. 14, 2026

(54) OPTICAL PULSE TEST DEVICE AND OPTICAL PULSE TEST METHOD

(71) Applicant: ANRITSU CORPORATION, Kanagawa (JP)

(72) Inventors: Ryota Takasu, Kanagawa (JP); Taichi Murakami, Kanagawa (JP); Kodai Ishida, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 251 days.

(21) Appl. No.: 18/330,044

(22) Filed: Jun. 6, 2023

(65) Prior Publication Data

US 2023/0400383 A1    Dec. 14, 2023

(30) Foreign Application Priority Data

Jun. 14, 2022    (JP) ................................. 2022-096102

(51) Int. Cl.
*H04B 10/00*        (2013.01)
*G01M 11/00*       (2006.01)

(52) U.S. Cl.
CPC .............................. *G01M 11/3145* (2013.01)

(58) Field of Classification Search
CPC ...................... G01M 11/3145; G01M 11/3118
See application file for complete search history.

(56) References Cited

U.S. PATENT DOCUMENTS

| | | | | |
|---|---|---|---|---|
| 5,933,227 A | * | 8/1999 | Furuhashi | H04B 10/071 |
| | | | | 356/73.1 |
| 2005/0117830 A1 | * | 6/2005 | Hartog | G01M 11/319 |
| | | | | 374/E11.015 |
| 2006/0256319 A1 | * | 11/2006 | Beller | G01M 11/3145 |
| | | | | 356/73.1 |
| 2012/0045205 A1 | * | 2/2012 | Perron | H04B 10/0795 |
| | | | | 398/48 |
| 2014/0226970 A1 | * | 8/2014 | Urban | G01M 11/3127 |
| | | | | 398/21 |
| 2019/0257715 A1 | * | 8/2019 | Leiria | H04B 10/071 |
| 2020/0200645 A1 | * | 6/2020 | Perron | G01M 11/3145 |
| 2020/0370949 A1 | * | 11/2020 | Ip | H04B 10/071 |
| 2020/0408572 A1 | * | 12/2020 | Ronnekleiv | G01D 5/35306 |
| 2021/0199536 A1 | * | 7/2021 | Perron | G01M 11/3145 |
| 2022/0170765 A1 | * | 6/2022 | Yano | G01D 5/35354 |

(Continued)

FOREIGN PATENT DOCUMENTS

JP        2012-167935 A       9/2012

*Primary Examiner* — Agustin Bello
(74) *Attorney, Agent, or Firm* — McDonald Hopkins LLC

(57)        ABSTRACT

According to the present disclosure, an optical pulse test device includes an OTDR waveform measurement unit that measures an OTDR waveform with a plurality of pulse widths, an event analysis unit that calculates a level, a loss, and a return loss at a start point of each event, and an analysis result integration unit that calculates a cumulative loss at the start point and an end point of each event from the level, the loss, and the return loss at the start point of each event, determines a pulse width that enables securing of a required SN ratio or more for each of the start point and the end point of each event, integrates the cumulative loss at each of the start point and the end point of each event with the determined pulse width, and sets the integrated cumulative loss as an analysis result.

8 Claims, 1 Drawing Sheet

(56) References Cited

U.S. PATENT DOCUMENTS

| | | | | |
|---|---|---|---|---|
| 2022/0376782 | A1* | 11/2022 | Jhaldiyal | H04B 10/0773 |
| 2022/0390321 | A1* | 12/2022 | Leclerc | H04B 10/071 |
| 2023/0308190 | A1* | 9/2023 | Zhdanova | H04B 10/25 |
| 2023/0400383 | A1* | 12/2023 | Takasu | G01M 11/3145 |
| 2025/0003789 | A1* | 1/2025 | Wakisaka | G01H 9/004 |

* cited by examiner

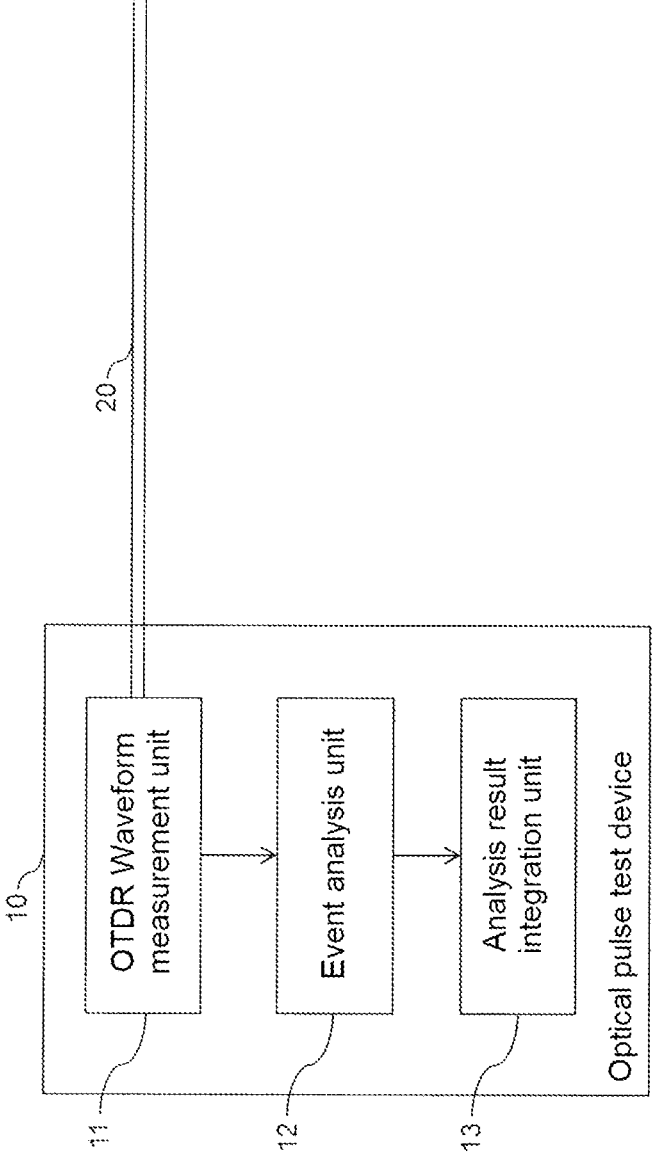

1

OPTICAL PULSE TEST DEVICE AND OPTICAL PULSE TEST METHOD

TECHNICAL FIELD

The present disclosure relates to an optical pulse test device and an optical pulse test method that measure an OTDR waveform with a plurality of pulse widths in accordance with an event and integrate analysis results of the measured OTDR waveforms.

BACKGROUND ART

A method of detecting an event occurring in an object under test based on a measured optical time domain reflectometer (OTDR) waveform is known (see Patent Document 1, for example). A device according to the related art measures an OTDR waveform in an object under test, extracts a change point in the measured OTDR waveform, and generates an ideal waveform when an event occurs at the change point. Then, the device extracts a difference between the measured OTDR waveform and the ideal waveform. When there is a difference amount, the device determines that there is an undetected event at a position of the difference amount, and detects all events included in the OTDR waveform.

RELATED ART DOCUMENT

Patent Document

[Patent Document 1] JP-A-2012-167935

DISCLOSURE OF THE INVENTION

Problem that the Invention is to Solve

In the related art, the OTDR waveform is measured in accordance with measurement conditions determined in advance in consideration of the trade-off relationship between a dynamic range and an SN ratio, and the distance resolution. Therefore, when a pulse width is increased to secure the dynamic range and the SN ratio, there is a problem that it is not possible to detect adjacent events. In addition, when the pulse width is reduced to secure the distance resolution, there are problems that the dynamic range is reduced, and it is not possible to detect an event on a far end side or it is not possible to detect an event such as a small loss or a small level difference that occur in the object under test because such an event is buried in a noise component.

To solve the above problems, an object of the present disclosure is to provide an optical pulse test device and an optical pulse test method capable of detecting each event included in an OTDR waveform.

Means for Solving the Problem

To achieve the above object, an optical pulse test device and an optical pulse test method according to the present disclosure determine a pulse width in accordance with a cumulative loss for each event included in an OTDR waveform, measure the OTDR waveform with the determined pulse width, and integrate analysis results of the measured OTDR waveforms.

Specifically, the optical pulse test device according to the present disclosure includes an OTDR waveform measurement unit that measures an OTDR waveform in an object under test with a plurality of pulse widths, an event analysis unit that calculates, from the OTDR waveform measured by the OTDR waveform measurement unit, a level, a loss, and a return loss at a start point of each event occurring in the object under test, and an analysis result integration unit that calculates a cumulative loss at the start point and an end point of each event from the level, the loss, and the return loss at the start point of each event, which are calculated by the event analysis unit, for each of the plurality of pulse widths, determines a pulse width that enables securing of a required SN ratio or more for each of the start point and the end point of each event, integrates the cumulative loss at each of the start point and the end point of each event with the determined pulse width, and sets the integrated cumulative loss as an analysis result.

In the optical pulse test device according to the present disclosure, the event analysis unit may calculate a position of the start point and a position of the end point of each event occurring in the object under test, from the OTDR waveform measured by the OTDR waveform measurement unit, and the analysis result integration unit may integrate, as the analysis result, the position of the start point, the position of the end point of each event, and the return loss, which are calculated by the event analysis unit for the plurality of pulse widths.

In the optical pulse test device according to the present disclosure, the event analysis unit may calculate the level, the loss, and the return loss at the start point of each event by using a least square approximation (LSA) method for the OTDR waveform.

In the optical pulse test device according to the present disclosure, the event analysis unit may calculate the level, the loss, and the return loss at the start point of each event by performing nonlinear fitting of an event model function to the OTDR waveform.

Specifically, an optical pulse test method according to the present disclosure includes an OTDR waveform measurement step of measuring an OTDR waveform in an object under test with a plurality of pulse widths, an event analysis step of calculating, from the OTDR waveform measured in the OTDR waveform measurement step, a level, a loss, and a return loss at a start point of each event occurring in the object under test, and an analysis result integration step of calculating a cumulative loss at the start point and an end point of each event from the level, the loss, and the return loss at the start point of each event, which are calculated in the event analysis step, for each of the plurality of pulse widths, determining a pulse width that enables securing of a required SN ratio or more for each of the start point and the end point of each event, integrating the cumulative loss at each of the start point and the end point of each event with the determined pulse width, and setting the integrated cumulative loss as an analysis result.

In the optical pulse test method according to the present disclosure, in the event analysis step, a position of the start point and a position of the end point of each event occurring in the object under test may be calculated from the OTDR waveform measured in the OTDR waveform measurement step, and, in the analysis result integration step, the position of the start point, the position of the end point of each event, and the return loss, which are calculated in the event analysis step for the plurality of pulse widths, may be integrated as the analysis result.

In the optical pulse test method according to the present disclosure, in the event analysis step, the level, the loss, and the return loss at the start point of each event may be calculated by using a least square approximation (LSA) method for the OTDR waveform.

In the optical pulse test method according to the present disclosure, in the event analysis step, the level, the loss, and the return loss at the start point of each event may be calculated by performing nonlinear fitting of an event model function to the OTDR waveform.

The above inventions can be combined as much as possible.

Advantage of the Invention

According to the present disclosure, it is possible to provide an optical pulse test device and an optical pulse test method capable of detecting each event included in an OTDR waveform.

BRIEF DESCRIPTION OF THE DRAWINGS

FIG. 1 illustrates an example of a schematic configuration and a use form of an optical pulse test device according to Embodiment 1.

BEST MODE FOR CARRYING OUT THE INVENTION

Hereinafter, an embodiment of the present disclosure will be described in detail with reference to the drawings. The present disclosure is not limited to the embodiment described below. These implementation examples are merely illustrative, and the present disclosure can be implemented in various modified and improved forms based on the knowledge of those skilled in the art. It is assumed that, in this specification and the drawings, components having the same reference numerals are the same as each other.

Embodiment 1

FIG. 1 illustrates an example of a schematic configuration of an optical pulse test device according to the present embodiment. According to the present embodiment, an optical pulse test device 10 includes an OTDR waveform measurement unit 11 that measures an OTDR waveform in an object 20 under test with a plurality of pulse widths, an event analysis unit 12 that calculates, from the OTDR waveform measured by the OTDR waveform measurement unit 11, a level, a loss, and a return loss at a start point of each event occurring in the object 20 under test, and an analysis result integration unit 13 that calculates a cumulative loss at the start point and an end point of each event from the level, the loss, and the return loss at the start point of each event, which are calculated by the event analysis unit 12, for each of the plurality of pulse widths, determines a pulse width that enables securing of a required SN ratio or more for each of the start point and the end point of each event, integrates the cumulative loss at each of the start point and the end point of each event with the determined pulse width, and sets the integrated cumulative loss as an analysis result. Here, the present embodiment will be described by using an object 20 under test with a PON configuration, but the present invention is not limited to this.

(OTDR Waveform Measurement Step)

The OTDR waveform measurement unit 11 measures an OTDR waveform of the object 20 under test with a plurality of pulse widths. Here, the plurality of pulse widths may be determined by the analysis result integration unit 13 as described later. In this case, the OTDR waveform measurement unit 11 measures the OTDR waveform each time the analysis result integration unit 13 determines the pulse width.

(Event Analysis Step)

The event analysis unit 12 calculates the position of a start point of each event occurring in the object 20 under test, the level of the start point, the position of an end point, a loss, and a return loss from the OTDR waveform measured by the OTDR waveform measurement unit 11. The event analysis unit 12 may calculate the position of the start point of each event, the level of the start point, the position of the end point, the loss, and the return loss by using the least square approximation (LSA) method for the OTDR waveform. The LSA method is a method of detecting an event by using linear approximation for the OTDR waveform. In addition, the event analysis unit 12 may calculate the position of the start point of each event, the level of the start point, the position of the end point, the loss, and the return loss by nonlinear fitting of an event model function to the OTDR waveform. Nonlinear fitting means performing the least square method between the event model function which is a non-linear function, and the OTDR waveform. Here, in the nonlinear fitting, in order to calculate the initial values of the position of the start point of each event, the level of the start point, the position of the end point, the loss, and the return loss, the position of the start point of each event may be estimated by using a differentiation method for the OTDR waveform, or the position of the start point of each event may be estimated by using wavelet transform on the OTDR waveform.

(Analysis Result Integration Step)

The analysis result integration unit 13 obtains the cumulative loss at the start point and the cumulative loss at the end point of each event based on the level, the loss, and the return loss at the start point of each event, which are calculated by the event analysis unit 12. The pulse width that enables securing of a required SN ratio or more for an event on the farthest end side is determined from the cumulative loss at the end point of the event on the farthest end side among the obtained cumulative losses.

In the present embodiment, a difference between an entrance level (level at an incident end) of the OTDR waveform and a noise peak level is defined as a margin $\alpha$, and a difference between a level at which the SN ratio of the OTDR waveform is 1 and the noise peak level is defined as a margin $\alpha_m$. In addition, a pulse width having a dynamic range (the "dynamic range" is abbreviated as a "DR" below) that satisfies Expression (1) is defined as a "pulse width that enables securing of a required SN ratio or more".

[Math. 1]

$$\text{Cumulative loss} + \alpha_m \leq DR \leq \text{Cumulative loss} + \alpha \tag{1}$$

When there are a plurality of pulse widths that enable securing of a required SN ratio or more for the end point of the event on the farthest end side, a measurement pulse width is set in order from the largest pulse width, and the OTDR waveform measurement unit 11 is caused to measure the OTDR waveform of the object 20 under test for each pulse width.

Further, when the OTDR waveform measurement unit 11 has not measured the OTDR waveform, the analysis result integration unit 13 may calculate the initial value of the cumulative loss from the configuration of the object 20 under test, and determine the pulse width from the initial value of the cumulative loss. For example, when the object 20 under test has a PON configuration of "1×4-1×32", 3 dB×7=21 dB may be set as the initial value of the cumulative loss.

After the OTDR waveform for each of the pulse widths that enable securing of a required SN ratio or more for the end point of the event on the farthest end side is measured, the analysis result integration unit 13 similarly determines the pulse width that enables securing of a required SN ratio or more for the start point of the event on the farthest end side, and measures an OTDR waveform for each pulse width. For a pulse width that overlaps the pulse width that enables securing of a required SN ratio or more for the end point of the event on the farthest end side among pulse widths that enable securing of a required SN ratio or more for the start point thereof, the OTDR waveform that has already been measured may be used without measuring a new OTDR waveform.

After the measurement of the OTDR waveform has completed for each pulse width that enables securing of a required SN ratio or more for the end point and the start point of the event on the farthest end side, in the similar manner, the analysis result integration unit 13 determines the pulse width that enables securing of a required SN ratio or more for the end point and the start point of an event on the next farthest end side, and measures an OTDR waveform for each pulse width.

In this manner, for all events included in the OTDR waveform, the analysis result integration unit 13 determines the pulse width that enables securing of a required SN ratio or more for each of the end point and the start point in order from the far end side and measures an OTDR waveform for each pulse width. When the pulse widths that enable securing of a required SN ratio or more overlap each other between events, an OTDR waveform that has already been measured may be used without measuring a new OTDR waveform. Although the pulse width is determined from the event on the far end side in the present embodiment, the present invention is not limited to this.

The analysis result integration unit 13 includes an event table of integrating the position of the start point of the event, the position of the end point, the cumulative loss at the start point, and the loss due to the event, which are calculated for each event included in the OTDR waveform for each pulse width, and setting the result of the integration as an analysis result.

The analysis result integration unit 13 updates the event table each time the cumulative loss at each of the start point and the end point of each event is calculated from the OTDR waveform.

Specifically, for each event, the analysis result integration unit 13 may set the cumulative loss at the start point and the end point at the widest pulse width among the pulse widths that enable calculation of the cumulative loss at the start point and the end point, as the cumulative loss at the start point and the end point of each event. The cumulative loss at the start point is set to have a value obtained by subtracting the level at a distance of 0 km from the level at the start point. The cumulative loss at the end point is set to have a value obtained by subtracting the level at the distance of 0 km from the level at the end point. Also, the loss in the event is set to have a value obtained by subtracting the cumulative loss at the start point of the event from the cumulative loss at the end point of the event.

The analysis result integration unit 13 may integrate the position of the start point, the position of the end point, and the return loss of each event calculated by the event analysis unit 12 for a plurality of pulse widths, as the analysis result.

Specifically, the analysis result integration unit 13 may detect the event among the plurality of measured pulse widths with respect to the position of the start point and the return loss of each event, and adopt a value of the minimum pulse width in which the start point of the event has a required noise amplitude or less. For the position of the end point of each event, the analysis result integration unit 13 may detect the event among the plurality of measured pulse widths, and adopt a value of the minimum pulse width in which the end point of the event has a required noise amplitude or less.

The analysis result integration unit 13 may prepare a plurality of pulse width candidates in advance and determine the pulse width from the plurality of prepared pulse width candidates as described above.

As described above, according to the present disclosure, it is possible to provide an optical pulse test device and an optical pulse test method capable of detecting each event included in an OTDR waveform.

INDUSTRIAL APPLICABILITY

The optical pulse test device and the optical pulse test method according to the present disclosure can be applied to the optical measuring instrument industry.

DESCRIPTION OF REFERENCE NUMERALS AND SIGNS

10 Optical Pulse Test Device
11 OTDR Waveform Measurement Unit
12 Event Analysis Unit
13 Analysis Result Integration Unit
20 Object Under Test

What is claimed is:

1. An optical pulse test device comprising:
   an OTDR waveform measurement unit configured to measure an OTDR waveform in an object under test with a plurality of pulse widths;
   an event analysis unit configured to calculate, from the OTDR waveform measured by the OTDR waveform measurement unit, a level, a loss, and a return loss at a start point of each event occurring in the object under test; and
   an analysis result integration unit configured to calculate a cumulative loss at the start point and an end point of each event from the level, the loss, and the return loss at the start point of each event, which are calculated by the event analysis unit, for each of the plurality of pulse widths, determine, for each event, a pulse width that enables securing of a required SN ratio or more for each of the start point and the end point of each event, integrate the cumulative loss at each of the start point and the end point of each event with the determined pulse width, and set the integrated cumulative loss as an analysis result.

2. The optical pulse test device according to claim 1, wherein
   the event analysis unit is configured to calculate a position of the start point and a position of the end point of each event occurring in the object under test, from the OTDR waveform measured by the OTDR waveform measurement unit, and
   the analysis result integration unit is configured to integrate, as the analysis result, the position of the start point, the position of the end point of each event, and the return loss, which are calculated by the event analysis unit for the plurality of pulse widths.

3. The optical pulse test device according to claim 1, wherein the event analysis unit is configured to calculate the level, the loss, and the return loss at the start point of each event by using a least square approximation (LSA) method for the OTDR waveform.

4. The optical pulse test device according to claim 1, wherein the event analysis unit is configured to calculate the level, the loss, and the return loss at the start point of each event by performing nonlinear fitting of an event model function to the OTDR waveform.

5. An optical pulse test method comprising:

an OTDR waveform measurement step of measuring an OTDR waveform in an object under test with a plurality of pulse widths;

an event analysis step of calculating, from the OTDR waveform measured in the OTDR waveform measurement step, a level, a loss, and a return loss at a start point of each event occurring in the object under test; and an analysis result integration step of calculating a cumulative loss at the start point and an end point of each event from the level, the loss, and the return loss at the start point of each event, which are calculated in the event analysis step, for each of the plurality of pulse widths, determining, for each event, a pulse width that enables securing of a required SN ratio or more for each of the start point and the end point of each event, integrating the cumulative loss at each of the start point and the end point of each event with the determined pulse width, and setting the integrated cumulative loss as an analysis result.

6. The optical pulse test method according to claim 5, wherein in the event analysis step, a position of the start point and a position of the end point of each event occurring in the object under test are calculated from the OTDR waveform measured in the OTDR waveform measurement step, and in the analysis result integration step, the position of the start point, the position of the end point of each event, and the return loss, which are calculated in the event analysis step for the plurality of pulse widths, are integrated as the analysis result.

7. The optical pulse test method according to claim 5, wherein in the event analysis step, the level, the loss, and the return loss at the start point of each event are calculated by using a least square approximation (LSA) method for the OTDR waveform.

8. The optical pulse test method according to claim 5, wherein in the event analysis step, the level, the loss, and the return loss at the start point of each event are calculated by performing nonlinear fitting of an event model function to the OTDR waveform.

* * * * *